US011573983B2

(12) United States Patent
Lu et al.

(10) Patent No.: US 11,573,983 B2
(45) Date of Patent: Feb. 7, 2023

(54) DATA CLASSIFICATION

(71) Applicant: International Business Machines Corporation, Armonk, NY (US)

(72) Inventors: Liang Lu, BeiJing (CN); Yue Wang, Beijing (CN); Sun Chun Hua, Beijing (CN); Jian Ling Shi, Baoji (CN); Yi Yang Ren, Beijing (CN); Chun Leng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 16/919,256

(22) Filed: Jul. 2, 2020

(65) Prior Publication Data

US 2022/0004566 A1    Jan. 6, 2022

(51) Int. Cl.
*G06F 16/00* (2019.01)
*G06F 16/28* (2019.01)

(52) U.S. Cl.
CPC ................... *G06F 16/285* (2019.01)

(58) Field of Classification Search
CPC ..................................................... G06F 16/285
USPC ......................................................... 707/737
See application file for complete search history.

(56) References Cited

U.S. PATENT DOCUMENTS

| 7,043,492 | B1 * | 5/2006 | Neal | G06F 16/353 |
| | | | | 707/707 |
| 8,140,584 | B2 * | 3/2012 | Guha | G06F 16/31 |
| | | | | 707/802 |
| 10,037,358 | B2 * | 7/2018 | Faitelson | G06F 16/93 |
| | | | | 707/707 |
| 11,164,245 | B1 * | 11/2021 | Resheff | G06Q 20/3821 |
| | | | | 707/707 |
| 2006/0282442 | A1 * | 12/2006 | Lennon | G06V 30/40 |
| | | | | 707/707 |
| 2007/0282827 | A1 * | 12/2007 | Levin | G06F 16/285 |
| | | | | 707/999.005 |
| 2010/0179936 | A1 * | 7/2010 | Jeremiah | G06K 9/6217 |
| | | | | 706/50 |
| 2011/0289040 | A1 * | 11/2011 | Johnson | G06F 16/35 |
| | | | | 706/50 |
| 2014/0058539 | A1 * | 2/2014 | Park | G05B 13/0265 |
| | | | | 700/50 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Alexandria Y Bromell
(74) *Attorney, Agent, or Firm* — Peter K. Suchecki

(57) ABSTRACT

Provided is a method, computer program product, and system for classifying a set of data items based on format organizations. A processor may determine at least one format organization of a set of data items. The format organization of a data item indicates a symbol type of at least one continuous symbol in the data item and a number of the at least one continuous symbol. The processor may determine at least one candidate data class for the set of data items from a plurality of predetermined data classes based on the at least one format organization. The processor may classify the set of data items into at least one target data class selected from the at least one candidate data class. In this way, the set of data items can be efficiently classified.

17 Claims, 9 Drawing Sheets

(56) References Cited

U.S. PATENT DOCUMENTS

2017/0011480 A1\* 1/2017 Morimoto ............ G06Q 10/107
707/707
2019/0130027 A1\* 5/2019 Maier ................. G06F 16/3334
707/707

\* cited by examiner

600

| SYMBOL TYPE | MEANING |
|---|---|
| C | CHARACTER TYPE (A, B, C, ...) |
| D | NUMBER TYPE (1, 2, 3, ...) |
| S | SPECIAL CODE TYPE (-, #, @, ...) |
| U | UNICODE TYPE EXCEPT FOR Ü CÜ AND Ü SÜ (CHINESE CHARACTER ETC.) |

FIG. 6

DATA CLASSIFICATION

BACKGROUND

The present disclosure relates to computing, and more specifically to a method, system, and computer program product for classifying a set of data items based on format organizations.

Data classification plays an important role in the area of data management, for example in column analysis in Database Management Systems. Specifically, data classification is a process of assigning one or more data classes to data items, such as data items in a database column or flat file, during a data analysis job. A variety of data management products provide data classification capabilities to automatically detect a data class for unknown data items. For example, the data management products can analyze the data items or metadata of the data items, and then detect the data class for these data items.

SUMMARY

Embodiments of the present disclosure include a method, computer program product, and system for classifying a set of data items based on format organizations.

According to a first aspect of the present disclosure, there is provided a computer-implemented method. According to the method, at least one format organization of a set of data items is determined. A format organization of a data item indicates a symbol type of at least one continuous symbol in the data item and the number of the at least one continuous symbol. At least one candidate data class for the set of data items is determined from a plurality of predetermined data classes based on the at least one format organization. The set of data items are classified into at least one target data class selected from the at least one candidate data class.

According to a second aspect of the present disclosure, there is provided a system. The system comprises a processor and a memory coupled to the processor and storing instructions thereon. The instructions, when executed by the processor, cause the processor to perform steps comprising: determining at least one format organization of a set of data items, a format organization of a data item indicating a symbol type of at least one continuous symbol in the data item and the number of the at least one continuous symbol; determining, based on the at least one format organization, at least one candidate data class for the set of data items from a plurality of predetermined data classes; and classifying the set of data items into at least one target data class selected from the at least one candidate data class.

According to a third aspect of the present disclosure, there is provided a computer program product comprising a computer-readable storage medium having program instructions embodied therewith. The program instructions are executable by a processor to cause the processor to perform steps comprising: determining at least one format organization of a set of data items, a format organization of a data item indicating a symbol type of at least one continuous symbol in the data item and the number of the at least one continuous symbol; determining, based on the at least one format organization, at least one candidate data class for the set of data items from a plurality of predetermined data classes; and classifying the set of data items into at least one target data class selected from the at least one candidate data class.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 6 depicts a schematic diagram of an example of symbol types according to some embodiments of the present disclosure.

Figure 1:
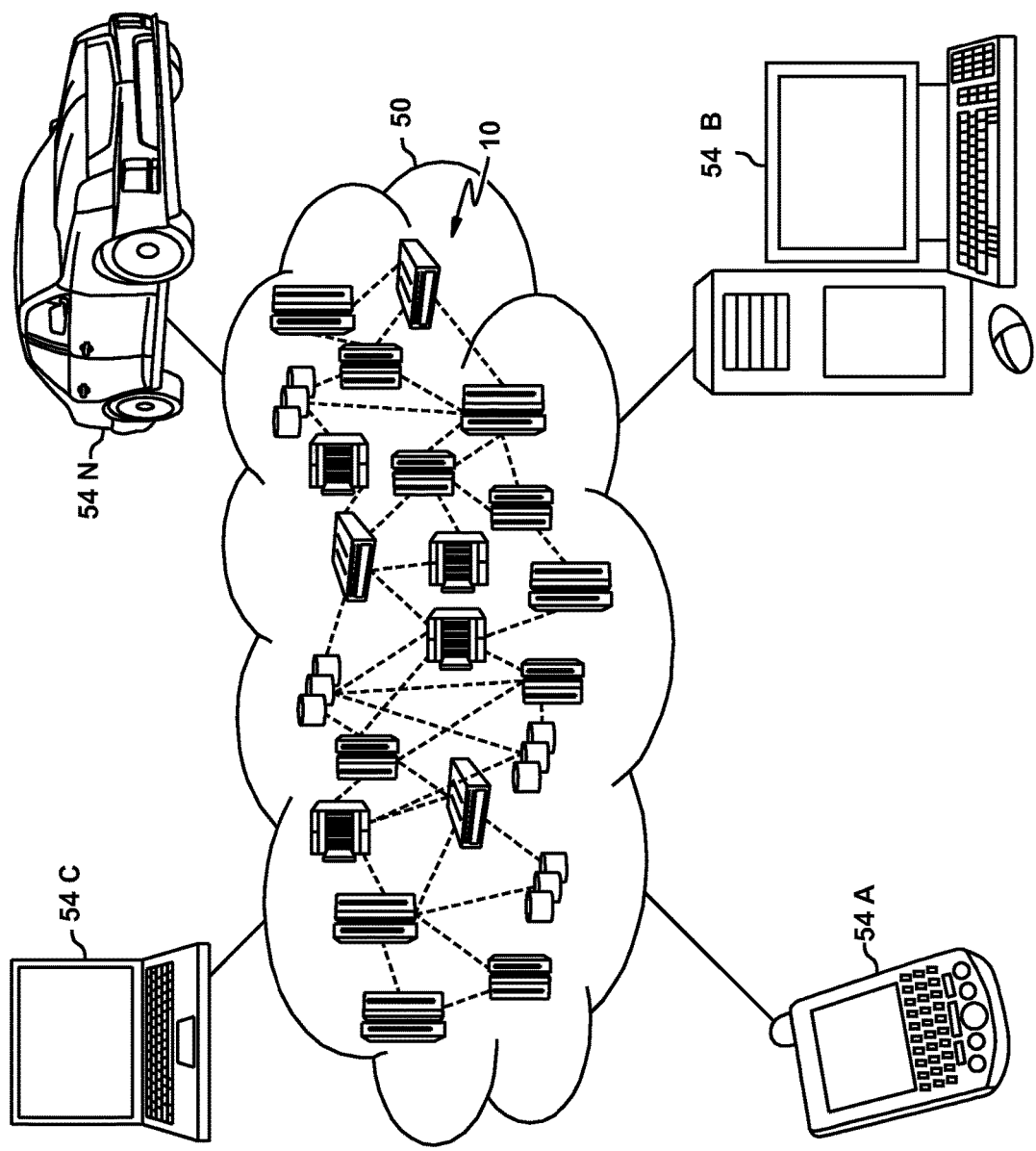
FIG. 1 depicts a cloud computing environment according to some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of computing, and more particularly to a method, system, and computer program product for classifying a set of data items based on format organizations. While the present disclosure is not necessarily limited to such applications, various aspects of the disclosure may be appreciated through a discussion of various examples using this context.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
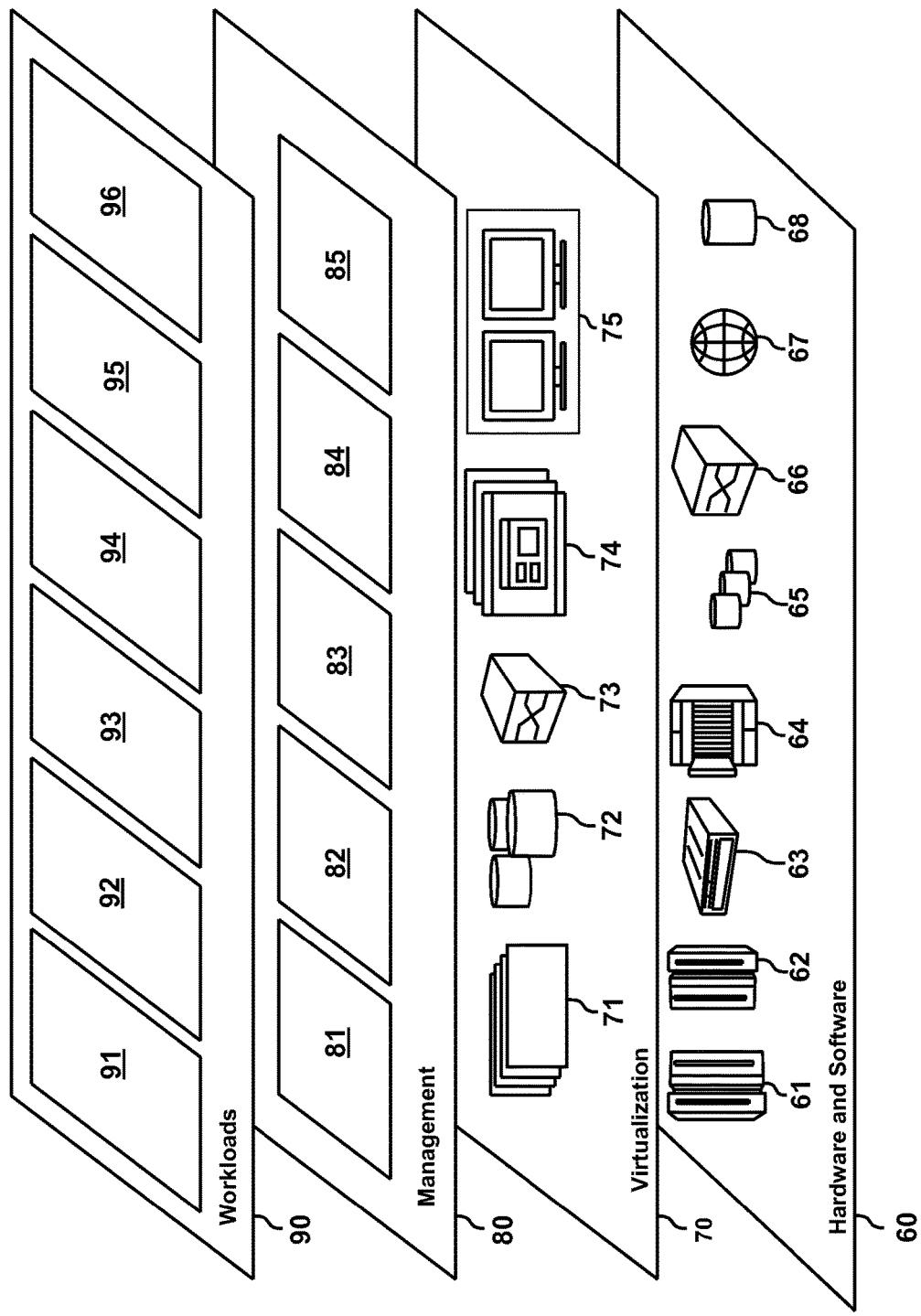
FIG. 2 depicts abstraction model layers according to some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data classification 96.

Figure 3:
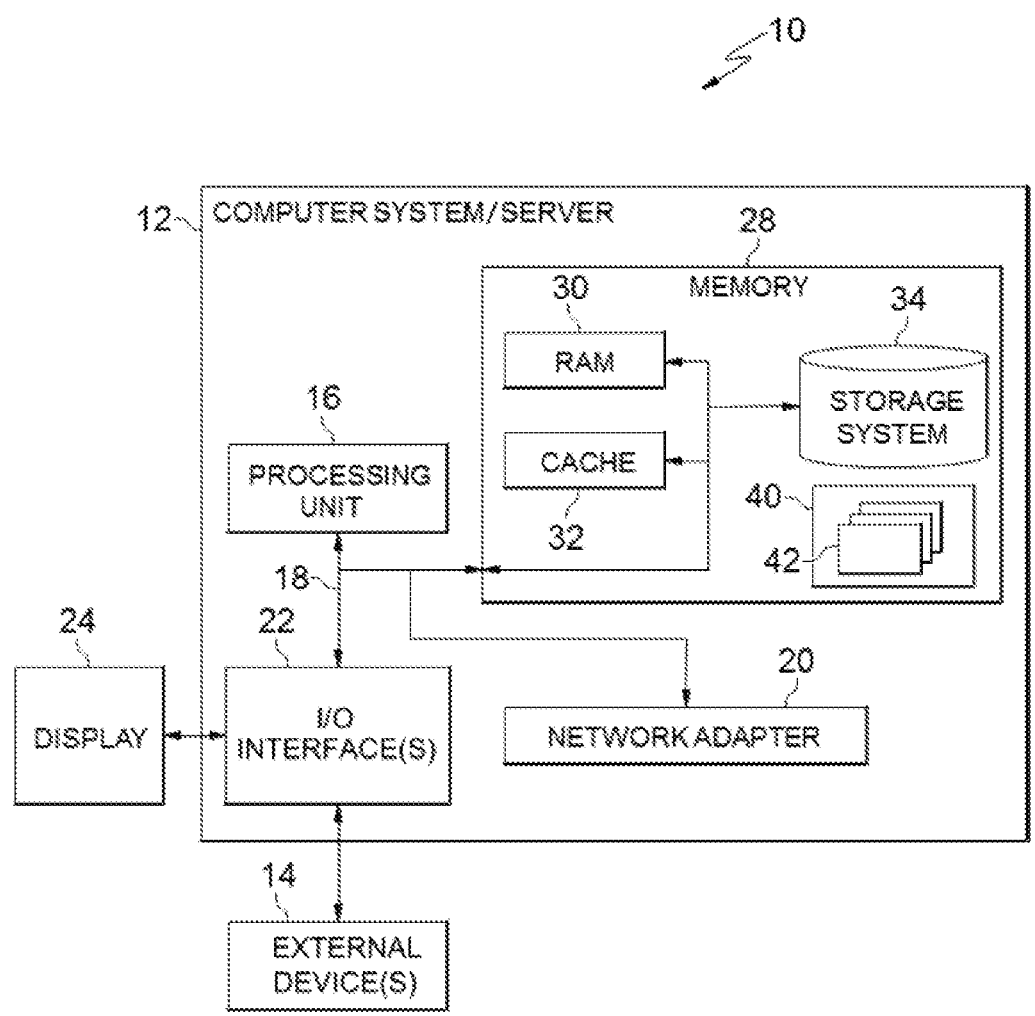
FIG. 3 depicts a cloud computing node according to some embodiments of the present disclosure.

Referring now to FIG. 3, a schematic of an example of a cloud computing node 10 is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the present disclosure relate to improving the efficiency of data classification. In some instances, a data class of a set of data items needs to be determined. For example, for a column in a table, which of the predetermined data classes in the system this column belongs to needs to be determined. In another example, although description information for the set of data items, such as a column name or other appropriate information, may imply the data class of the set of data items, the implied data class described in the description information may be inconsistent with the predetermined data classes in the system. For example, the column name may indicate the "license number", but the predetermined data class in the system is the "license plate number". In this case, the data class of the column cannot be directly determined by the column name. Thus, data classification needs to be performed on all data items in the set to determine the data class of the set.

The data classification in traditional data classification products is inefficient. This is because, in order to find out the exact data class for the set of data items, all data classes in the system have to be analyzed during the data classification. In this case, it may take a long time for the traditional data classification products to find the probable data class, especially in processing a set comprising a large amount of data.

For instance, in a scenario, it is assumed that the data classes of M columns in a table are to be determined, these data classes are to be selected from N predetermined data classes in the system, and each column has K data items. Traditionally, each data item in each column has to be analyzed against all the N data classes to determine whether this data item belongs to one of the N data classes in order to determine a data class for each M column from the N data classes. For example, the most frequently appeared data class among the K data classes may be chosen to be the data class of the column. Thus, the total analysis workload is K*M*N operations. In this case, it might take several days to complete the data classification in handling a set comprising a large volume of data.

An improved solution for data classification is provided in this disclosure. Generally speaking, according to embodiments of the present disclosure, at least one format organization of a set of data items is determined. A format organization of a data item indicates a symbol type of at least one continuous symbol in the data item and the number of the at least one continuous symbol. At least one candidate data class for the set of data items is determined from a plurality of predetermined data classes based on the at least one format organization. The set of data items are classified into at least one target data class selected from the at least one candidate data class.

In accordance with the data classification mechanism as proposed herein, a subset of all the data classes in the system is selected based on the format organizations of the data items, such that only a few data classes need to be analyzed during the data classification. As a result, time spent in the data classification can be significantly reduced, thereby improving the efficiency of the data management.

Figure 4:
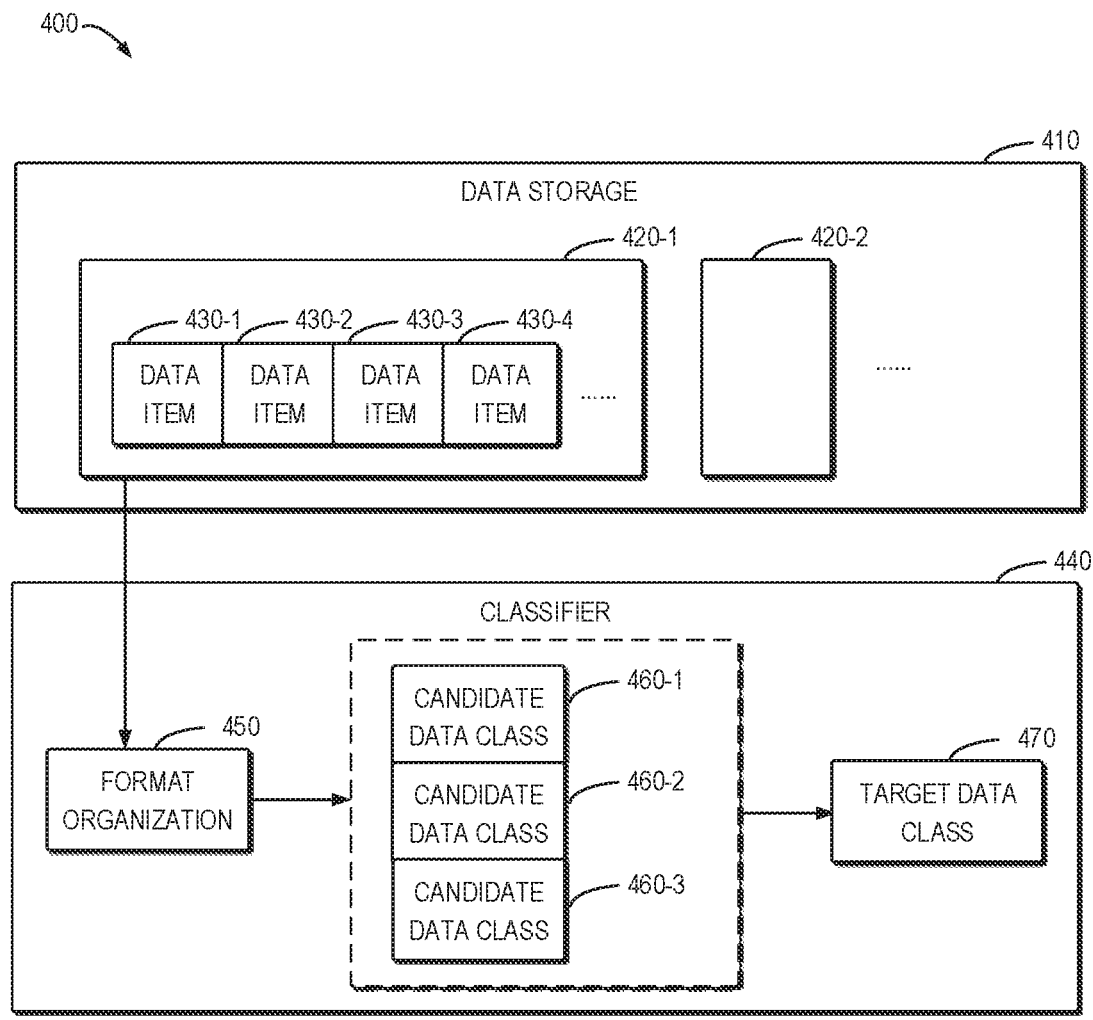
FIG. 4 depicts a schematic diagram of an example of a data classification environment in which embodiments of the present disclosure can be implemented.

Referring now to FIG. 4, shown is a schematic diagram of an example of a data classification environment 400 in which an embodiment of the present disclosure can be implemented.

The data classification environment 400 may include a data storage 410 and a classifier 440. The data storage 410 may store multiple sets of data items, such as the sets 420-1 and 420-2 (collectively or individually referred to as "the set(s) 420") of data items. Each set includes at least one data item, such as the set 420-1 may include data items 430-1 to 430-4 (collectively or individually referred to as data item(s) 430). For example, a database table containing a plurality of columns can be stored in the data storage 410, and a column can represent a set of data items, such as the set 420-1. It is understood that the number of the sets and the number of data items included in each set are intended to be illustrative only, and embodiments of the disclosure are not limited thereto.

The classifier 440 performs data classification on the set 420, such that the data class of the set 420 may be efficiently and intelligently determined. The data class indicates a class or type that the set of data items belongs to. For example, the data classes may be "ID Card", "Passport", "Date", "Birthday", "Timestamp," and the like. Specifically, the classifier 440 may determine at least one format organization of the set 420 and select a subset of all the data classes based on the at least one format organization. The format organization of a data item indicates an organization of the symbols in the data item, such as the data item 430-1. For example, the format organization may be represented by a symbol type of at least one continuous symbol in the data item and the number of the at least one continuous symbol. The at least one format organization of at least one data item included in the set is used to determine the format organization of the set. In this case, the workload for the data classification can be enormously reduced. The data classification performed by the classifier 440 is described with reference to FIGS. 5-9.

Figure 5:
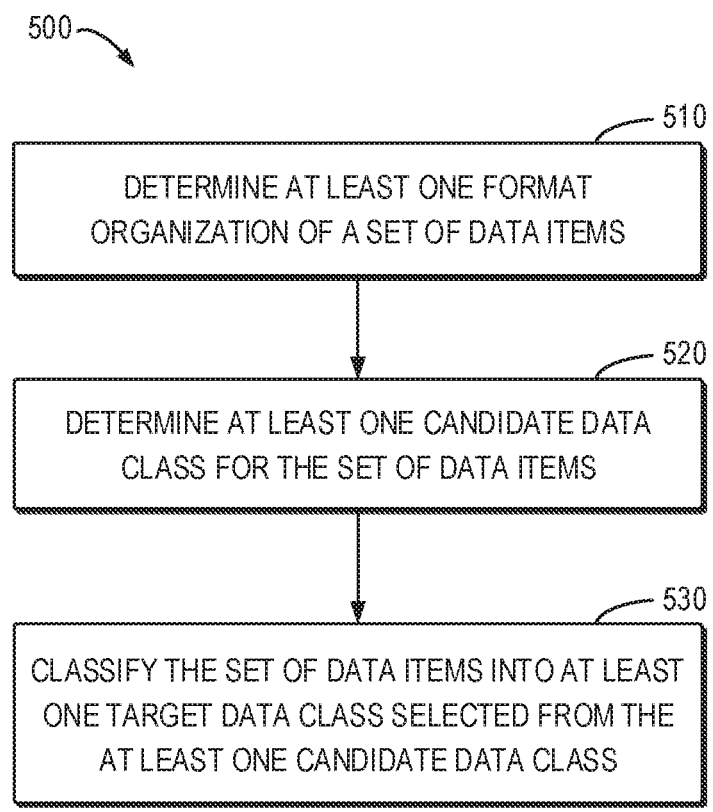
FIG. 5 depicts a flowchart of an example of a method for data classification according to some embodiments of the present disclosure.

Referring now to FIG. 5, shown is a flowchart of an example of a method 500 for data classification according to some embodiments of the present disclosure. The method 500 may be implemented by the classifier 440, or other suitable computer/computing systems. For ease of understanding, the method 500 will be described with reference to FIG. 4.

At 510, the classifier 440 determines at least one format organization of the set 420 of data items. A format organization indicates a symbol type of at least one continuous symbol in a data item 430 in the set 420 of data items and the number of the at least one continuous symbol.

Various symbol types may be defined as shown in FIG. 6. FIG. 6 depicts a schematic diagram of an example table 600 of symbol types according to some embodiments of the present disclosure. As shown in FIG. 6, the symbol type may include a character type (represented as "C"), a number type (represented as "D"), a special code type such as "-", "#", "@" (represented as "S"), and a Unicode type except for the character type and the special code type, such as the Chinese character (represented as "U"). In this case, the format organization can be represented by the abbreviated symbol type and the number of continuous symbols of this symbol type. For example, it is assumed that the data item 430-1 is "2000/01/01", the data item 430-2 is "20200201", the data item 430-3 is "1998年7月18日" and the data item 430-4 is "April-17-2020". Thus, the format organizations of the data items 430-1 to 430-4 are "D4S1D2S1D2", "D8", "D4U1D1U1D2U1", and "C5S1D2S1D4", respectively.

In some embodiments, the classifier 440 may generate respective format organizations for respective data items included in the set 420 of data items. For example, for each of the data items 430 in the set 420 of data items, the classifier 440 may generate a format organization. Similarly, the format organization indicates a symbol type of at least one continuous symbol in the data item 430 and the number of the at least one continuous symbol. Alternatively, in some embodiments, it is not necessary to generate a format organization for each of data items 430, especially when there is a large amount of data items 430. Instead, the data items 430 in the set 420 of data items may be sampled, and the sampled result, which is a subset of all the data items 430, may be used for the determination of the format organization.

More specifically, in some embodiments, in order to generate a format organization of a data item 430, the classifier 440 may determine at least one symbol type of at least one symbol included in the data item 430, such as the character type "C", the number type "D", the special code type "S", and the Unicode type "U".

The classifier 440 may divide the data item 430 into at least one part based on the determined symbol type(s), such that each part comprises at least one continuous symbol with the same symbol type. For example, the data item 430-1 "2000/01/01" can be divided into "2000", "/", "01", "/," and "01".

In this case, the classifier 440 can determine the number of the at least one continuous symbol with the same symbol type for each of these parts. Thereby, the classifier 440 can generate a format organization for the data item 430 based on the symbol type(s) and its corresponding number of the at least one continuous symbol. For example, the format organization of the data item 430-1 is "D4S1D2S1D2".

For the set 420 of data items, the classifier 440 may determine the number of occurrences of each format organization, and a format organization with the number of occurrences exceeding a first predefined threshold can be selected as the format organization of the set 420 of data items. For example, the rank of occurrence or the occurrence probability can be used as the first predefined threshold. It is assumed that the format organization "D8" occurs most frequently or exceeding 80% which is the first predefined threshold. In this case, the format organization "D8" can be selected as the format organization 450 of the set 420 of data items, as shown in FIG. 4.

At 520, the classifier 440 may determine, based on the format organization 450, at least one candidate data class for the set 420 of data items from a plurality of predefined data classes, such as the candidate data classes 460-1 to 460-3 (collectively or individually referred to as "the candidate data class(es) 460"). For example, it is assumed that the candidate data classes 460-1 to 460-3 are "Date", "Birthday" and "Timestamp", respectively.

Thereby, at 530, the classifier 440 may classify the set 420 of data items into at least one target data class 470 selected from the at least one candidate data class 460. In some embodiments, for a data item 430 in the set 420, the classifier 440 may determine whether the data item 430 matches a regular expression corresponding to a candidate data class 460. The determination can be performed on all or a subset of the data items included in the set 420. The regular expression represents a pattern of a string of characters. The regular expression is more powerful than the format organization. Specifically, unlike the format organization which only indicates a symbol type of continuous symbols and the number of the continuous symbols, the regular expression can represent any string pattern. For example, the regular expression may represent a string that begins with digits 0-9. Thus, the regular expression can be used to accurately determine whether the data item 430 belongs to the candidate data class 460.

If the data item 430 matches the regular expression of a certain candidate data class, the classifier 440 may select this candidate data class as an intermediate data class. For example, the regular expression corresponding to the candidate data class 460-1 "Date" may be "\d{8}", and the data item 430-2 "20200201" matches this regular expression. As a result, the classifier 440 may classify the data item 430-2 "20200201" into the intermediate data class "Date".

Then, the classifier 440 may classify the set of data items into the target data class based on at least one intermediate data class. For example, the classifier 440 may select one intermediate data class from the at least one intermediate data class as the target data class of the set 420 of data items, in which the number of occurrences of the selected intermediate data class exceeds a second predefined threshold.

It can be seen that the number of the candidate data classes is very small relative to the total number of all the data classes, and only a few predetermined data classes need to be analyzed during the data classification. As a result, the efficiency of the data classification can be substantially improved in an efficient manner.

In some embodiments, the classifier 440 may determine a predetermined format organization that can be grouped together with the format organization. For example, format organizations in the same group may be associated with the same data classes. That is to say, data classes associated with the predetermined format organization(s) may also be associated with the format organization. In this case, the classifier 440 may select the data classes associated with the predetermined format organization(s) from all the data classes to be the candidate data classes 460. The determination of the candidate data class 460 will be described in detail with reference to FIG. 7.

Figure 7:
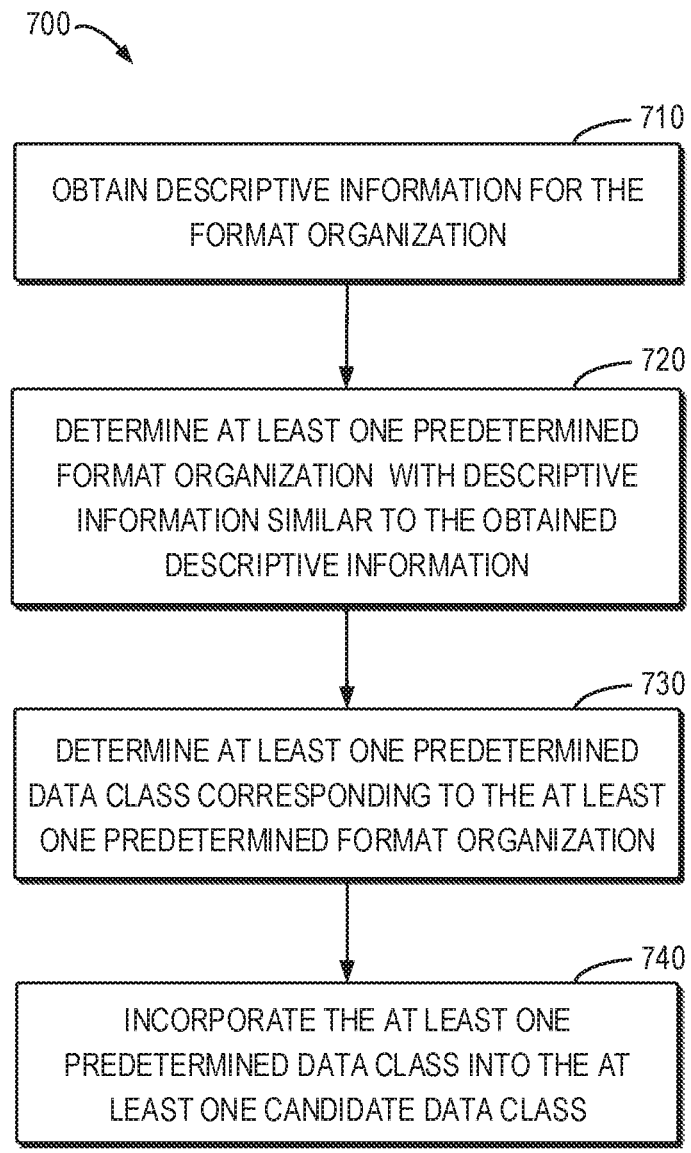
FIG. 7 depicts a flowchart of an example of a method for determining a candidate data class for a format organization according to some embodiments of the present disclosure.

FIG. 7 depicts a flowchart of an example of a method 700 for determining a candidate data class 460 for a format organization according to some embodiments of the present disclosure. In some embodiments, descriptive information is stored in association with the set 420 of data items. The descriptive information may describe information implying a data class of the set 420 of data items. For example, the descriptive information may be "this column stores the time information". Since the set 420 of data items corresponds to the at least one format organization, the descriptive information can also be treated as in association with the at least one format organization. That is to say, the descriptive information describes the data class of the at least one format organization.

As shown in FIG. 7, for each format organization of the at least one format organization, at 710, the classifier 440 may obtain descriptive information for the format organization. Since the descriptive information may imply the data class, format organizations with similar descriptive information may have similar data classes. In this case, at 720, the classifier 440 may determine at least one predetermined format organization with descriptive information similar to the obtained descriptive information, in which the at least one predetermined format organization corresponds to at least one predetermined data class in the plurality of predetermined data classes. In some embodiments, the classifier 440 may segment the descriptive information for the format organization into a plurality of words, and determine key words from these words. The classifier 440 may further determine respective word frequencies of these key words. The word frequency indicates the number of occurrences of the key word in the descriptive information. The similarity between two pieces of descriptive information can be determined based on their respective keywords and respective word frequencies of respective keywords.

Figure 8:
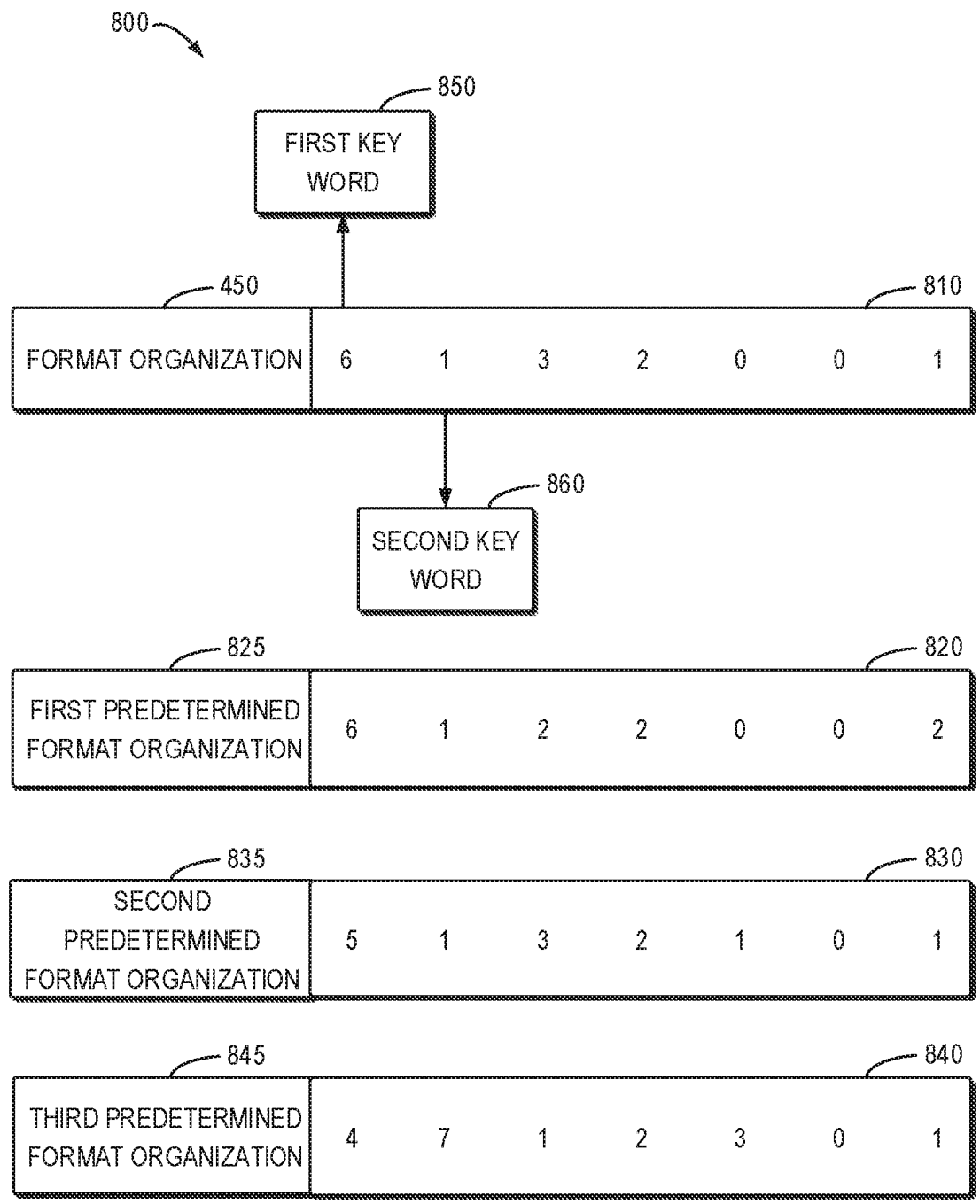
FIG. 8 depicts a schematic diagram of an example of word frequencies according to some embodiments of the present disclosure.

Referring to FIG. 8, shown is a schematic diagram of an example 800 of word frequencies according to some embodiments of the present disclosure. In some embodiments, as shown in FIG. 8, these word frequencies may constitute a vector. An example vector 810 for the format organization is "(6 1 3 2 0 0 1)", which means the first key word 850 (for example, "column") occurs 6 times in the descriptive information, the second key word 860 (for example, "license") occurs 1 times in the descriptive information, and so on. It should be noted that the fifth and sixth key words occur 0 time in the descriptive information; in other words, the fifth and sixth key words do not occur in the descriptive information. This is because the elements in the vector take into consideration all key words occurring in descriptive information of all the sets 420 of data items including, for example, descriptive information of all the columns in all tables stored in the data storage 410. In this case, some key words may not occur in the descriptive information of a certain format organization, and their word frequencies for this format organization may be 0.

Based on the above all key words occurring in descriptive information of all the sets 420 of data items, format organizations with similar word frequency patterns may imply that the key words of these format organizations are similar, and thus these format organizations are similar. In this case, the classifier 440 may use the determined word frequencies for the format organization to determine the at least one predetermined format organization with similar word frequency pattern(s).

More specifically, the classifier 440 may determine a similarity between word frequencies for each of the predetermined format organizations and the determined word frequencies for the format organization, and select a predetermined format organization with the similarity exceeding a similarity threshold.

For example, the classifier 440 may determine a similarity between the word frequency vector 810 for the format organization 450 and the word frequency vector 820 for the first predetermined format organization 825, a similarity between the word frequency vector 810 for the format organization 450 and the word frequency vector 830 for the second predetermined format organization 835, and a similarity between the word frequency vector 810 for the format organization 450 and the word frequency vector 840 for the third predetermined format organization 845.

In the embodiments shown in FIG. 8, the similarities between the word frequency vector 810 and the word frequency vectors 820 and 830 exceed the similarity threshold, and thereby the first and second predetermined format organizations 825 and 835 are selected. It is understood that the number of the predetermined format organizations is intended to be illustrative only and embodiments of the disclosure are not limited thereto.

The classifier 440 may employ various approaches to select the predetermined format organization. For example, the classifier 440 may use Multi-Label K-Nearest Neighbor (ML KNN) algorithm to determine the similarity or distance between word frequencies and select the predetermined format organizations. In addition to the Multi-Label clustering algorithm, the classifier 440 may also use a statistics method to determine the similarity between word frequencies and select the predetermined format organizations.

Returning to FIG. 7, at 730, the classifier 440 may determine the at least one predetermined data class corresponding to the at least one predetermined format organization. The predetermined format organization is previously determined to belong to the predetermined data class. For example, the predetermined format organization is historically determined to belong to the predetermined data class with traditional data classification or with the data classification of the present disclosure.

Figure 9:
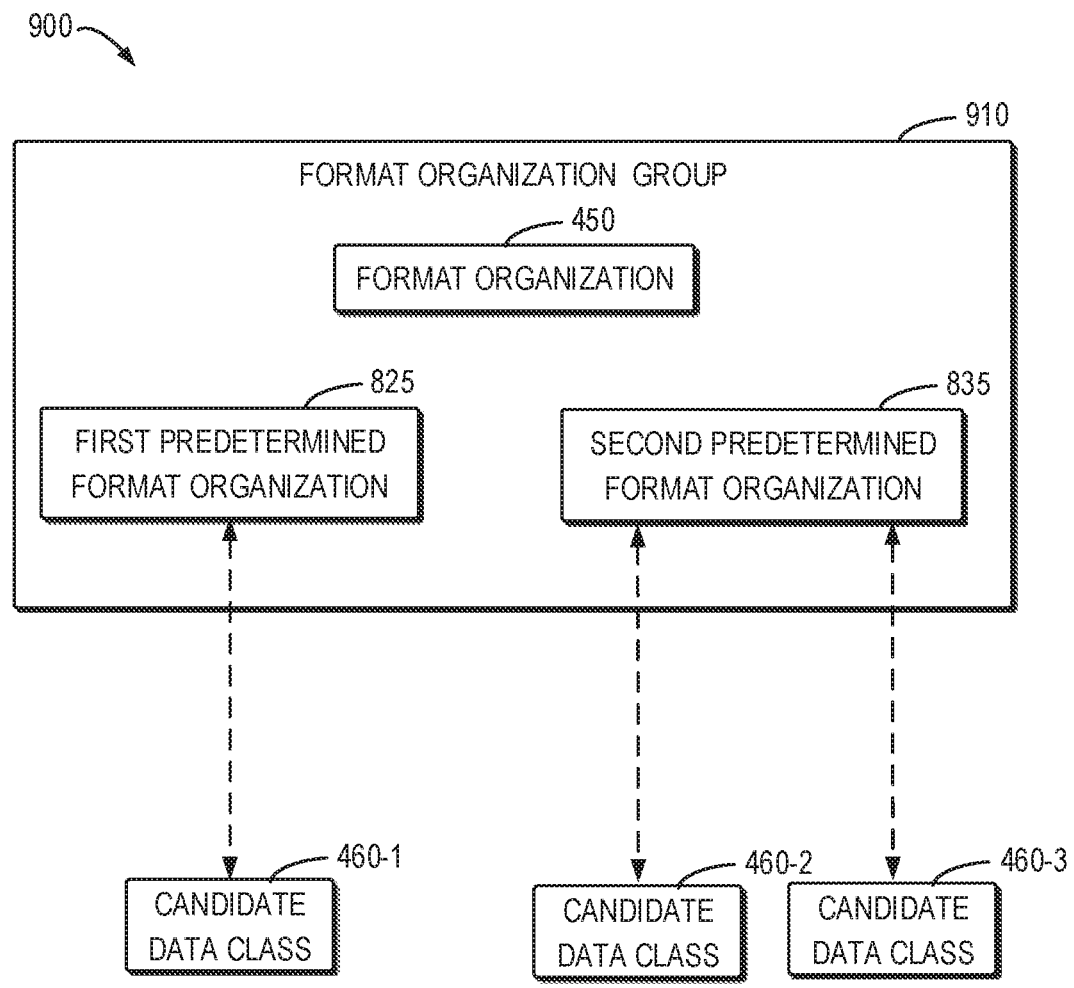
FIG. 9 depicts a schematic diagram of an example of candidate data classes according to some embodiments of the present disclosure.

At 740, the classifier 440 may incorporate the at least one predetermined data class into the at least one candidate data class. FIG. 9 depicts a schematic diagram of an example 900 of candidate data classes according to some embodiments of the present disclosure. For example, it is assumed that the first and second predetermined format organizations 825 and 835 are similar to the format organization and can form a format organization group 910. The first predetermined format organization 825 corresponds to the candidate data class 460-1, and the second predetermined format organization 835 corresponds to the candidate data classes 460-2 and 460-3. In this case, the data classes 460-1 to 460-3 are incorporated into the at least one candidate data class.

In this way, the candidate data class 460 can be determined intelligently and precisely by grouping the format organization with other predetermined format organizations using the descriptive information thereof, and selecting the data classes that are predetermined to be associated with the other format organizations to be the candidate data class 460 of the format organization.

In summary, the efficiency of the data classification is significantly improved. For example, as discussed above, the total workload in the traditional data classification can be calculated based on the following equation:

$$K*M*N \tag{1},$$

where K represents the number of data items in each column, M represents the number of the columns and N represents the number of the data classes. If there are 100 columns, each column has 100,000 data items, and there are 200 data classes, the workload is 100,000*100*200=2,000,000,000.

In comparison, the total workload in the data classification of the present disclosure can be calculated based on the following equation:

$$M*(F1+F2+K*C) \tag{2},$$

where M represents the number of the columns, F1 represents the number of operations for determining the format organization, F2 represents the number of operations for determining the candidate data class, K represents the number of data items in each column and C represents the number of candidate data class. If there are 100 columns, each column has 100,000 data items, there are 2 format organizations, and there are 20 candidate data classes for each format organization, the workload is 100*(100,000+ 2*20+100,000*20)=210,000,000.

It can be indicated that, the workload for the traditional data classification is about 10 times higher than that of the data classification of the present disclosure. Thus, the data classification of the present disclosure enormously accelerates the processing of the data classes for a set of data items, especially against a set comprising a large amount of data.

In some embodiments, the classified set of data items can be used in a variety of scenarios. For example, the classified sets can be tagged with their respective classes, such that the sets and their corresponding tags can be used as input samples of a perdition model for predicting the class of an unclassified set. In another example, the classified sets can be processed in different ways, such as the set of license plate number class can be used to in the traffic statistics, and the set of birthday class can be used to perform an analysis of the online shopping preferences of people of varying demographics.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   determining at least one format organization of a set of data items, a format organization of a data item indicating a symbol type of at least one continuous symbol in the data item and a number of the at least one continuous symbol, wherein determining the at least one format organization of the set of data items comprises:
      generating respective format organizations for respective data items included in the set of data items;
      determining a number of occurrences of the respective format organizations; and
      selecting, from the respective format organizations, a first format organization with the number of occurrences exceeding a threshold as the at least one format organization of the set of data items;
   determining, based on the at least one format organization, at least one candidate data class for the set of data items from a plurality of predetermined data classes; and
   classifying the set of data items into at least one target data class selected from the at least one candidate data class.

2. The computer-implemented method of claim 1, wherein generating the respective format organizations for the respective data items included in the set of data items comprises, for each respective data item included in the set of data items:
   determining at least one symbol type of at least one symbol included in a respective data item;
   dividing, based on the at least one symbol type, the respective data item into at least one part, each part comprising the at least one continuous symbol with a same symbol type;
   determining the number of the at least one continuous symbol with the same symbol type for each of the at least one part; and generating a first respective format organization for the respective data item based on the at least one symbol type and the number of the at least one continuous symbol with the same symbol type.

3. The computer-implemented method of claim 1, wherein determining the at least one candidate data class for the set of data items comprises, for each format organization of the at least one format organization:
   obtaining descriptive information for the format organization, the descriptive information being stored in association with the set of data items and describing a data class of the format organization;
   determining at least one predetermined format organization with descriptive information similar to the obtained descriptive information, wherein the at least one predetermined format organization corresponds to at least one predetermined data class in the plurality of predetermined data classes;
   determining the at least one predetermined data class corresponding to the at least one predetermined format organization; and
   incorporating the at least one predetermined data class into the at least one candidate data class.

4. The computer-implemented method of claim 3, wherein determining the at least one predetermined format organization comprises:
   segmenting the descriptive information for the format organization into a plurality of words;
   determining at least one key word from the plurality of words;
   determining respective word frequencies of the at least one key word, a word frequency of a key word indicating a number of occurrences of the key word in the descriptive information; and
   determining the at least one predetermined format organization from a plurality of predetermined format organizations based on the respective word frequencies.

5. The computer-implemented method of claim 4, wherein determining the at least one predetermined format organization from the plurality of predetermined format organizations based on the respective word frequencies comprises:
   determining a similarity between the respective word frequencies for each of the plurality of predetermined format organizations and the respective word frequencies for the format organization; and
   selecting from the plurality of predetermined format organizations, a first predetermined format organization with the similarity exceeding a similarity threshold as one of the at least one predetermined format organization.

6. The computer-implemented method of claim 1, wherein classifying the set of data items into the at least one target data class selected from the at least one candidate data class comprises, for each data item in the set of data items:
   determining whether the data item matches at least one regular expression corresponding to the at least one candidate data class;
   selecting, in response to a determination that the data item matches a regular expression in the at least one regular expression and from the at least one candidate data class, a first candidate data class corresponding to the regular expression as an intermediate data class; and
   classifying the set of data items into the target data class based on the intermediate data classes of respective data items in the set of data items.

7. A system, comprising:
   a processor; and
   a computer-readable storage medium communicatively coupled to the processor and storing program instructions which, when executed by the processor, cause the processor to perform a method comprising:
      determining at least one format organization of a set of data items, a format organization of a data item indicating a symbol type of at least one continuous symbol in the data item and a number of the at least one continuous symbol, wherein determining the at least one format organization of the set of data items comprises:
         generating respective format organizations for respective data items included in the set of data items;
         determining a number of occurrences of the respective format organizations; and
         selecting, from the respective format organizations, a first format organization with the number of occurrences exceeding a threshold as the at least one format organization of the set of data items;
      determining, based on the at least one format organization, at least one candidate data class for the set of data items from a plurality of predetermined data classes; and
      classifying the set of data items into at least one target data class selected from the at least one candidate data class.

8. The system of claim 7, wherein generating the respective format organizations for the respective data items included in the set of data items comprises for each respective data item included in the set of data items:
   determining at least one symbol type of at least one symbol included in a respective data item;
   dividing, based on the at least one symbol type, the respective data item into at least one part, each part comprising the at least one continuous symbol with a same symbol type;
   determining the number of the at least one continuous symbol with the same symbol type for each of the at least one part; and
   generating a first respective format organization for the respective data item based on the at least one symbol type and the number of the at least one continuous symbol with the same symbol type.

9. The system of claim 7, wherein determining the at least one candidate data class for the set of data items comprises, for each format organization of the at least one format organization:
   obtaining descriptive information for the format organization, the descriptive information being stored in association with the set of data items and describing a data class of the format organization;
   determining at least one predetermined format organization with descriptive information similar to the obtained descriptive information, wherein the at least one predetermined format organization corresponds to at least one predetermined data class in the plurality of predetermined data classes;
   determining the at least one predetermined data class corresponding to the at least one predetermined format organization; and
   incorporating the at least one predetermined data class into the at least one candidate data class.

10. The system of claim 9, wherein determining the at least one predetermined format organization comprises:
- segmenting the descriptive information for the format organization into a plurality of words;
- determining at least one key word from the plurality of words;
- determining respective word frequencies of the at least one key word, a word frequency of a key word indicating a number of occurrences of the key word in the descriptive information; and
- determining the at least one predetermined format organization from a plurality of predetermined format organizations based on the respective word frequencies.

11. The system of claim 10, wherein determining the at least one predetermined format organization from the plurality of predetermined format organizations based on the respective word frequencies comprises:
- determining a similarity between the respective word frequencies for each of the plurality of predetermined format organizations and the respective word frequencies for the format organization; and
- selecting, from the plurality of predetermined format organizations, a first predetermined format organization with the similarity exceeding a similarity threshold as one of the at least one predetermined format organization.

12. The system of claim 7, wherein classifying the set of data items into the at least one target data class selected from the at least one candidate data class comprises, for each data item in the set of data items:
- determining whether the data item matches at least one regular expression corresponding to the at least one candidate data class;
- selecting, in response to a determination that the data item matches a regular expression in the at least one regular expression and from the at least one candidate data class, a first candidate data class corresponding to the regular expression as an intermediate data class; and
- classifying the set of data items into the target data class based on the intermediate data class.

13. A computer program product, comprising a computer-readable storage medium having program instructions embodied therewith, the program instructions executable by a processor to cause the processor to perform a method comprising:
- determining at least one format organization of a set of data items, a format organization of a data item indicating a symbol type of at least one continuous symbol in the data item and the number of the at least one continuous symbol, wherein determining the at least one format organization of the set of data items comprises:
  - generating respective format organizations for respective data items included in the set of data items;
  - determining a number of occurrences of the respective format organizations; and
  - selecting, from the respective format organizations, a first format organization with the number of occurrences exceeding a threshold as the at least one format organization of the set of data items;
- determining, based on the at least one format organization, at least one candidate data class for the set of data items from a plurality of predetermined data classes; and
- classifying the set of data items into at least one target data class selected from the at least one candidate data class.

14. The computer program product of claim 13, wherein generating the respective format organizations for the respective data items included in the set of data items comprises, for each respective data item included in the set of data items:
- determining at least one symbol type of at least one symbol included in a respective data item;
- dividing, based on the at least one symbol type, the respective data item into at least one part, each part comprising the at least one continuous symbol with a same symbol type;
- determining the number of the at least one continuous symbol with the same symbol type for each of the at least one part; and
- generating a first respective format organization for the respective data item based on the at least one symbol type and the number of the at least one continuous symbol with the same symbol type.

15. The computer program product of claim 13, wherein determining the at least one candidate data class for the set of data items comprises, for each format organization of the at least one format organization:
- obtaining descriptive information for the format organization, the descriptive information being stored in association with the set of data items and describing a data class of the format organization;
- determining at least one predetermined format organization with descriptive information similar to the obtained descriptive information, wherein the at least one predetermined format organization corresponds to at least one predetermined data class in the plurality of predetermined data classes;
- determining the at least one predetermined data class corresponding to the at least one predetermined format organization; and
- incorporating the at least one predetermined data class into the at least one candidate data class.

16. The computer program product of claim 15, wherein determining the at least one predetermined format organization comprises:
- segmenting the descriptive information for the format organization into a plurality of words;
- determining at least one key word from the plurality of words;
- determining respective word frequencies of the at least one key word, a word frequency of a key word indicating the number of occurrences of the key word in the descriptive information; and
- determining the at least one predetermined format organization from a plurality of predetermined format organizations based on the respective word frequencies.

17. The computer program product of claim 16, wherein determining the at least one predetermined format organization from the plurality of predetermined format organizations based on the respective word frequencies comprises:
- determining a similarity between the respective word frequencies for each of the plurality of predetermined format organizations and the respective word frequencies for the format organization; and
- selecting, from the plurality of predetermined format organizations, a first predetermined format organization with the similarity exceeding a similarity threshold as one of the at least one predetermined format organization.

\* \* \* \* \*